United States Patent [19]

Kieffer

[11] 4,047,293

[45] Sept. 13, 1977

[54] OSCILLATING BLADE WINDING INSERTION DEVICE

[75] Inventor: Vernon E. Kieffer, St. Louis, Mo.

[73] Assignee: Emerson Electric Co., St. Louis, Mo.

[21] Appl. No.: 729,815

[22] Filed: Oct. 5, 1976

[51] Int. Cl.$^2$ ............................................. H02K 15/06
[52] U.S. Cl. ......................................... 29/736; 29/596
[58] Field of Search ............ 29/205 D, 205 E, 205 R, 29/576, 606, 732, 736, 734

[56] References Cited

U.S. PATENT DOCUMENTS

| 3,689,976 | 9/1972 | Donovan | 29/205 D |
|---|---|---|---|
| 3,717,918 | 2/1973 | Droll | 29/205 D |
| 3,872,568 | 3/1975 | Morr | 29/205 D |

*Primary Examiner*—Carl E. Hall
*Attorney, Agent, or Firm*—Polster, Polster and Lucchesi

[57] ABSTRACT

A winding insertion device for axially inserting the windings of a dynamoelectric machine is provided with a pair of blade holders axially aligned with respect to one another. A first set of blades is attached to one of the blade holders, and a second set of blades is attached to the second blade holder. Individual ones of the first and second blade sets are arranged alternately with respect to one another, and the blades define an annular array when viewed in plan. Means are provided for moving the first and second blade holders relative to each other in a reciprocal movement pattern during winding insertion, with consequent movement of the respective blade sets. Because of the relative blade holder movement, the actual distance of movement required for individual ones of the first and second blade sets is small. Consequently, the insertion device is compatible with a wide range of stator assembly stack heights constructed from laminations having a variety of slot configurations.

12 Claims, 5 Drawing Figures

OSCILLATING BLADE WINDING INSERTION DEVICE

BACKGROUND OF THE INVENTION

This invention relates to winding devices for dynamoelectric machines, and in particular, to axial coil insertion apparatus for inserting prewound coils into the slots of a stator assembly of a dynamoelectric machine. While the invention is described in conjunction with its application to induction motors, those skilled in the art will recognize the wider applicability of the invention disclosed hereinafter.

Axial insertion devices, of a type generally described in the U.S. Pat. No. 2,432,267, to Adamson, are widely used by motor manufacturers for inserting prewound coils into the slots of stator assemblies of dynamoelectric machines, particularly of the induction motor type. Commonly, axial insertion devices include an annular array of blades spaced with respect to one another so as to define gaps therebetween. The blades conventionally have a radially outward facing surface which abuts the teeth of the stator laminations forming the stator core of a conventional stator assembly for a dynamoelectric machine. The stator laminations have a central bore opening in them. A plurality of winding receiving slots extend radially outwardly from and communicate with the bore opening. That part of the lamination between successive slots delimits the stator teeth. The teeth have inboard faces about the bore opening which are spaced from one another to permit the communication between the slots and the bore opening. The gap between successive blades corresponds to the opening between successive teeth of the stator lamination. A device, known in the art as a stripper, is a fluted member having arms designed to extend through the gap between adjacent blades. The stripper is mounted for reciprocal movement between a first position below a free end of the blades and a second position where the stripper forces the prewound coils of wire over the free end of the blades, thereby depositing the coils in the slots of the stator core. It also is conventional to insert insulation wedges simultaneously with winding insertion the insulation wedges closing the communicative path between the bore opening and the winding receiving slots after winding placement.

Although axial insertion machines are widely used for motor manufacturing, the insertion process is not without complications. It is known that wire coils of certain sizes will tend to wedge or lock in the blade gaps, thus damaging the coils or jamming the coil insertion machine. Certain wire sizes required for the construction of a particular induction motor stator assembly winding may not be capable of insertion with a particular set of blades. Winding insertion success depends on the ratio of the gap width between adjacent blades and the diameter of the wire used for the motor winding. Although a variety of blade sets having different gap width normally are available to meet this contingency, the teardown and set-up time required for blade set changeover is disruptive of production schedules.

One solution to the jamming or wire turn fouling problem is given in the U.S. Pat. No. 3,689,976, to Donovan, issued Sept. 12, 1972. In Donovan, preselected ones, and preferably alternate ones of the blades are attached to the stripper so that the attached blades move with the stripper during the insertion stroke of the device. While Donovan works well for its intended purpose, it can not be used efficiently over a very wide range of motor types. As will be appreciated by those skilled in the art, the prewound coils used in axial insertion machines consist of a plurality of coil sets which are constructed from a plurality of individual wire turns. Each of the coil sets are intended to span some preselected number of teeth of the stator lamination. The wire turns comprising a coil set conventionally include a straight conductor run portion carried by the stator slots, and an end turn portion spanning a preselected number of stator teeth along the outboard faces of the stator core. The end turn portions connect successive ones of the straight conductor run portions of the wire turn. The physical dimensions of the coil sets spanning the fewest number of stator teeth is substantially smaller than the physical dimensions of the coil sets spanning the greatest number of stator teeth. While the physical attributes of the prewound coils generally are not a detriment when a single winding is inserted by the device, they can and do cause problems when multiple windings are inserted simultaneously. Since the Donovan device uses blades attached to the stripper to achieve the relative movement between blades, the movable blades necessarily move a long distance. The distance of movement is considerably greater than the height dimension of the coil sets, the height dimension being equivalent to the straight conductor run portions of the wire turn forming the coil set. Because of the dimensions involved, the movable blades often interfere with the insertion of the windings, particularly in the short span coil set members of the prewound coil. When interference occurs, the solution has been replacement of the movable blades with conventional fixed blades. Consequently, the desirable effect obtained with the moving blade concept described in Donovan is lost on a great number of motors during motor manufacture.

The invention disclosed hereinafter offers a new solution to the problems encountered with prior art devices using movable blades. It enables the entire annular array of blades to move relative to one another, regardless of blade position within the array by providing short stroke blade movement. Short stroke blade movement is achieved by moving alternate blades of the blade set reciprocally and out of phase with one another.

SUMMARY OF THE INVENTION

In accordance with this invention, generally stated, a winding device for axially inserting prewound coils into the slots of a dynamoelectric machine is provided with independent means for moving a plurality of blades of the winding device reciprocally with respect to one another. The winding device includes a first blade holder and a second blade holder axially aligned and movable with respect to each other. Preferably, an equal number of blades are attached to respective ones of the first and second blade holders. The blades attached to respective blade holders are assembled in an annular array, the blades being arranged alternately with respect to one another. The blades are positioned so that a predetermined spacing or gap exists between adjacent ones of the blades. A stripper is mounted for reciprocal movement within the blade array in a conventional manner. Means for reciprocating the first and second blade holders are operatively connected to each of the blade holders so that alternate ones of the blades move 180° out of phase with one another.

DESCRIPTION OF THE PREFERRED EMBODIMENT

Figure 1:
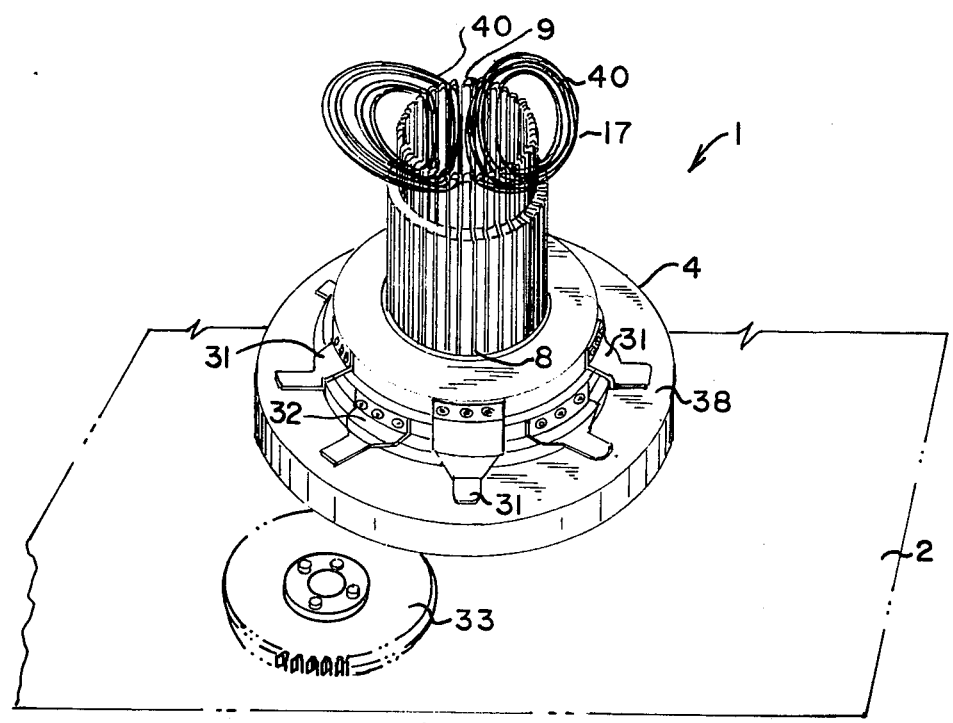
FIG. 1 is a view in perspective of one illustrative embodiment of winding device of this invention.

Referring not to FIG. 1, reference numeral 1 indicates one illustrative embodiment of winding device of this invention. The device 1 includes a support platform 2 having an upper tooling assembly 4 and a lower tooling assembly 5 associated with it.

The lower tooling assembly 5 is conventional and generally includes a power source and associated drive means for operating various portions of the upper tooling assembly 4. It is conventional for the lower tooling assembly 5 to include a wedge magazine and associated wedge pusher rods, not shown, for inserting wedges simultaneously with winding insertion. The lower tooling assembly 5, while important in the overall operation of the device 1, does not form a part of the invention. Consequently, it is not described in detail.

Figure 5:
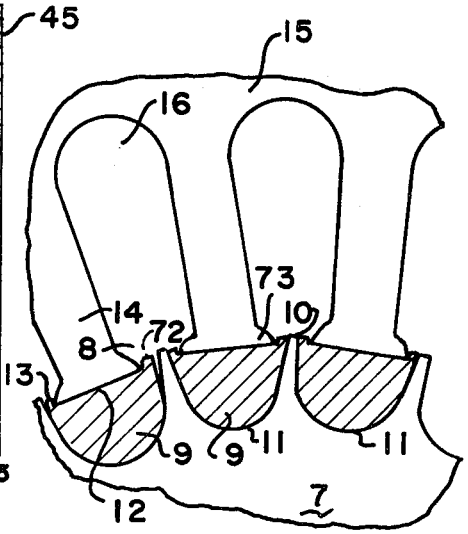
FIG. 5 is an enlarged view, partly in section and partly broken away, taken about the area 5—5 of FIG. 1.

A shaft 6 is connected to a drive means, not shown, along a first end of the shaft. A stripper 7 is attached to a second end 70 of the shaft 6. The stripper 7 is a fluted impeller having a plurality of lands 10 and grooves 11 formed along its outer periphery, as is best seen in FIG. 5. The lands 10 extend beyond and through a plurality of gaps 8 defined by adjacent ones of a plurality of blades 9. The stripper 7 operates or moves in conjunction with the shaft 6 between a first, loading position, shown in FIGS. 2 and 3, and a second position shown in dotted lines in FIG. 3.

Each of the blades 9 has a face 12 having a pair of rims 13 formed along the outboard edges of the blades, so that individual ones of a plurality of teeth 14 of a stator core assembly 15 may be positioned adjacent one of the blades 9. The stator core assembly 15 is constructed from a plurality of individual laminations. The core has a central bore opening 71 through it and the blades 9 are arranged in an annular array, the diameter of which is sized to allow core assembly 15 placement over the blade array. The core assembly 15 also has a plurality of radially extending slots 16 separated by the teeth 14. The slots 16 communicate with the bore opening 71 along slot openings 72 between tips 73 of the teeth 14. The slots 16 receive a motor winding 17 during the insertion process.

In general, the winding 17 is constructed from a plurality of coil sets 40, individual ones of the coil sets 40 spanning a predetermined number of the stator teeth 14. Each of the coil sets, in turn, is constructed from a plurality of individual wire turns. The wire turns include a straight conductor run portion carried in the slots 16, and an end turn portion which spans the predetermined number of teeth 14, the end turn portion connecting successive ones of the straight conductor run portions of the wire turns. The winding 17 is prewound prior to its insertion. A variety of winding machines are available for pre-winding the coils, and one such machine is shown and described in the U.S. Pat. to Kieffer, No. 3,714,973.

Figure 4:
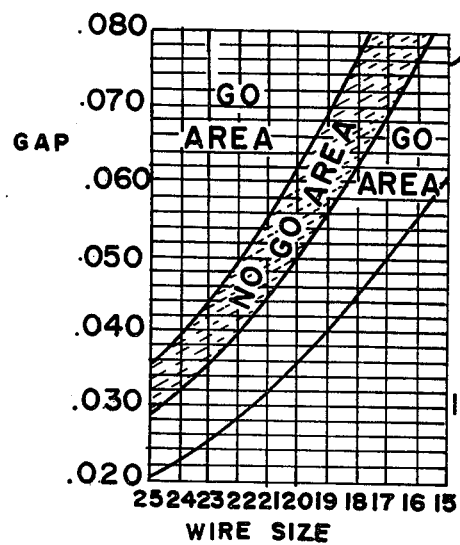
FIG. 4 is a graph illustrating permissable wire insertion area for a plurality of wire sizes and blade slot openings.

As indicated above, the ability to successfuly insert particular wire sizes within the stator core 15 is dependent upon the gap 8 between successive ones of the blades 9. FIG. 4 illustrates a typical, commercially available chart 45 which plots wire size against gap opening. Generally, gap opening is equivalent to the slot opening 72 less 0.030 inch compensation for the rim 13 of the blades 9. The likelihood of insertion success for a particular wire size with a particular upper tooling assembly 4 is obtained by plotting gap opening versus wire size to determine whether the relationship is in a "go" or a "no go" area of the chart 45. As previously stated, the insertion success "go" area can be increased if movable blades are used during the insertion process. The shorter end turn portion of the coil sets 40, however, do not permit utilization of the moving blades in all blade positions of the blade array in many motor designs in production. "Moving blades" in this instance, is taken in a connotation consistent with the prior art. That is to say, the blades are attached to and are movable with the stripper 7.

I have found that the advantages of movable blades can be obtained with little actual physical movement of the blades if the blades are moved relatively with respect to one another. To that end, a center bearing 18 is mounted over the shaft 6. Center bearing 18 is intended to permit movement of the shaft 6, and consequently the stripper 7, with simultaneous movement of an upper blade holder 19 and a lower blade holder 20. The blade holders 19 and 20 also are fluted structures having a plurality of grooves, not shown, formed in the periphery of the holder. The holders 19 and 20 are aligned with one another, and contain an equal number of grooves in their periphery. A first plurality of the blades 9 is attached to the upper blade holder 19, while a second plurality of the blades 9 is attached to the lower blade holder 20. The blades are arranged alternately with respect to one another, so that the array of blades is constructed from successive blades, alternate ones of which are attached to the blade holder 19 and the blade holder 20. The aligned relationship of the blade holders 19 and 20 enables the blades attached to the blade holder 20 to pass along the outer periphery of the upper blade holder 19.

Attachment of the blades to the holders 19 and 20 is accomplished in a conventional manner in that each of the holders 19 and 20 have a plurality of openings 21 and 22 respectively, formed in them. The openings 21 and 22 extend radially through the blade holders, and are intended to receive a threaded fastener 23 in a conventional manner. A plurality of wedge guides 24 are aligned with each of the blades 9. The wedge guides 24 are conventional, and are not described in detail. As indicated above, they permit insertion of insulation, the insulation acting to close the slot opening 72 between adjacent ones of the teeth 14, once the winding 17 is positioned in the slot 16. The wedge guides 24 and blades 9 abut one another and abut particular ones of the blade holders 19 and 20. The fasteners 23 are used to hold the wedge guides 24 and blades 9 in frictional engagement with respective ones of the upper and lower blade holders. That is, the blades 9 alternately are attached to one of the blade holders 19 and 20 through the fasteners 23.

Figure 2:
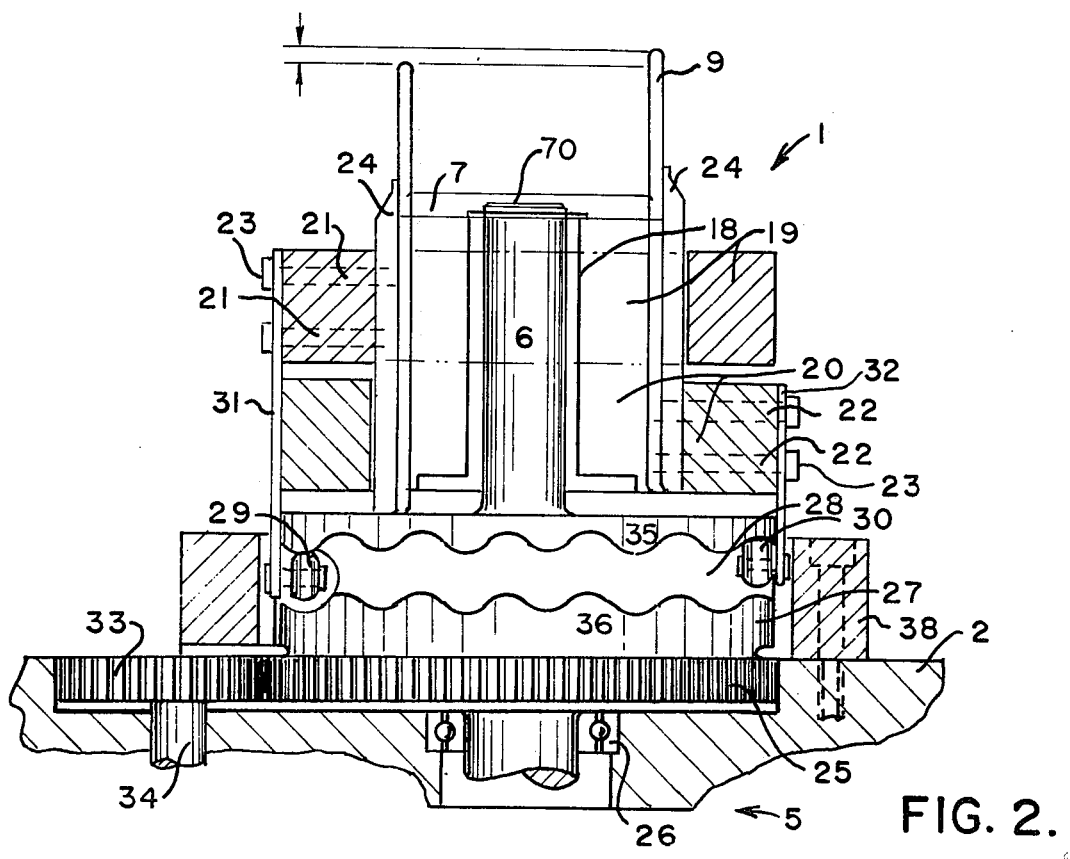
FIG. 2 is a sectional view of the winding device shown in FIG. 1.

A gear 25 is rotatably mounted to the support structure 2 along a suitable bearing means 26. The gear 25 is operatively connected to a drive means, not shown, through a gear 33 and its associated shaft 34. The gear 25 drives a cam ring 27, which also is supported on suitable bearings, not shown, to permit rotation of the cam rings 27 with the gear 25. Cam ring 27 includes an upper member 35 and a lower member 36 which are joined to and supported by one another along an outer support means 38. The members 35 and 36 define a race 28 for the cam ring 27. The race 28 is designed to receive a plurality of upper cam followers 29 and a plurality of lower cam followers 30. Each of the cam followers 29 is attached to a cam bracket 31 along a first end of the bracket. The second end of each of the brackets 31 is attached to the upper blade holder 19 by the fasteners 23. The cam brackets 31 may assume a variety of design configurations dictated, in large measure, by clearance requirements in the overall structural combination. FIGS. 1 and 2 are drawn to show possible variations. In FIG. 1, the cam brackets 31 are shown with an offset for this purpose, while they are shown generally planer in FIG. 2.

Each of the lower cam followers 30 also is attached to a cam bracket 32 along one end of the bracket. The cam bracket 32 is attached to the lower blade holder 20 along a second end of the bracket 32. Cam bracket 32 is similar to cam bracket 31, and is not described in detail. It too may have a variety of design configurations.

The cam followers 29 and 30 are arranged so that they are positioned in the cam race 28 180° out-of-phase with one another. That is to say, the race 28 has a series of peaks and valleys formed in it, and the cam follower 30 is positioned so that it is in a valley of the race when the cam follower 29 is at a peak of the race. It thus may be observed that the blade holders 19 and 20 are supported by the cam brackets 31 and 32. The brackets 31 and 32 in turn are attached to the cam followers 29 and 30, the followers 29 and 30 being movable along the race 28. Movement of the followers 29 and 30 therefore causes reciprocal or oscillatory motion of the blades 9.

Figure 3:
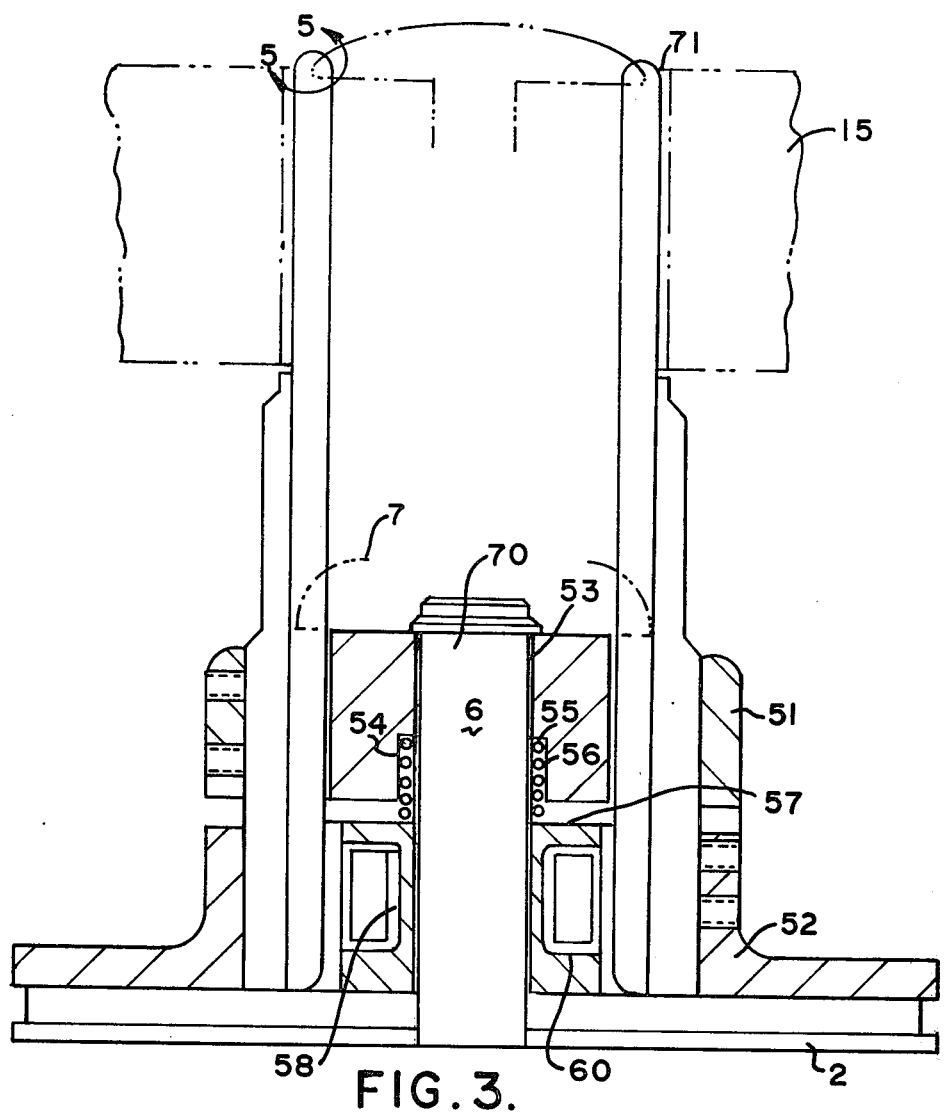
FIG. 3 is a sectional view of a second illustrative embodiment of winding device of this invention.

The embodiment just described and shown in conjunction with FIGS. 1 and 2 illustrates a mechanical means for obtaining blade movement between alternate blades of the array. FIG. 3 is an electrical equivalent of the mechanical embodiment. Like reference numerals have been utilized for like parts in FIG. 3, where appropriate. As there shown, an upper blade holder 51 is axially aligned with a lower blade holder 52. The blade holders 51 and 52 are similar to the blade holders 19 and 20 general function and design. However, a center bearing 53 is mounted over the shaft 6, and the blade holder 51 is mounted for reciprocal movement along the bearing 53. The blade holder 51 has a central channel 54 formed in it, a bottom wall 55 of which defines a seat for a spring 56. Spring 56 is biased between the wall 55 and a wall 57 of the blade holder 52.

Blade holder 52, in the embodiment of FIG. 3, is stationary, and is attached to the support platform 2 by any convenient method. The holder 52 has an annular receptacle 60 formed in it, which is sized to receive an electrical winding 58. The winding 58 is electrically connected to a source of electrical energy, not shown. The winding 58, when energized, induces physical vibrations in the blade holder 52. Those vibrations are transmitted to the blade holder 51 through the spring 56. Consequently, the blades 9 are permitted to oscillate or reciprocate with respect to one another, during the winding insertion cycle.

It thus may be apparent that a structure meeting all the ends and objects herein set forth above is provided.

Numerous variations, within the scope of the appended claims, will be apparent to those skilled in the art in light of the foregoing description and accompanying drawings. Thus, various changes in the silhouette of the structure described may be made. The design of the conventional portions of the upper and lower tooling assemblies may be varied. For example, the number and the physical design features of the blades 9 may be altered in other embodiments of this invention. Although the blade holder 52 was described as fixed, it too may be made movable. Thus a spring mounting arrangement between the holders 52 and the support platform 2 may be utilized if movement of both of the blade holders 51 and 52 is desired. Various electrical winding structures may be employed in order to induce desired vibrations. Likewise, other physical arrangements for providing the movement of the blades 9, in addition to the cam arrangement described, will occur to those skilled in the art. These variations are merely illustrative. I claim:

1. A winding insertion device, comprising:
    a supporting platform:
    a stripper operatively connected to and movable with respect to said supporting platform;
    a plurality of wedge guides mounted to said supporting platform;
    a first blade holder movably mounted on said supporting platform;
    a second blade holder axially aligned with said first blade holder and movably mounted on said supporting platform, said first and said second blade holders being relatively movable with respect to one another independent of movement of said stripper;
    a first plurality of blades arranged in an annular pattern, said first plurality of blades being mounted to said first blade holder;
    a second plurality of blades arranged in an annular pattern and mounted to said second blade holder, the annular pattern of said first and said second blade pluralities forming a single annular array, blades of said first and said second blade pluralities being alternately arranged with respect to one another in said array; and
    means for moving at least one of said first and said second blade holders with respect to the other of said first and said second blade holders so as to provide relative movement between said first and second blade pluralities during winding insertion.

2. The insertion device of claim 1 wherein both of said first and said second blade holders are movably mounted with respect to one another and to said supporting platform, said moving means comprising a cam track rotatably mounted to said support platform, said cam track including a race having a plurality of peaks and valleys formed in it, a first plurality of cam follower means operatively connected between said lower blade holder and said cam track, and a second plurality of cam follower means operatively connected between said cam track and said upper blade holder, said first plurality of cam follower means being positioned along a valley of said race when said first plurality of cam follower means is positioned along a peak of said race.

3. The insertion device of claim 2 wherein said first and said second plurality of cam follower means respectively include at least a first cam follower positioned in said race, and a cam bracket mounted between said cam follower and one of said first and second blade holders.

4. The winding insertion device of claim 1 wherein said moving means includes spring means biased between said first and said second blade holders, and means for vibrating one of said first and said second blade holders.

5. The device of claim 4 wherein said vibrating means is energizable electrically.

6. A winding insertion device, comprising:
a supporting platform:
a first blade holder movably mounted to said supporting platform;
a second blade holder mounted to said supporting platform;
a first plurality of blades mounted to said first blade holder, individual ones of said first blade pattern having a first end attached to said blade holder and a second free end;
a second pattern of blades mounted to said second blade holder, individual ones of said second blade pattern having a first end attached to said second blade holder and a free second end, the first and second patterns of blades forming an array, individual ones of said first and said second blades being alternately arranged with respect to one another in said array;
means for moving said first blade holder with respect to said second blade holder; and
means for forcing wire turns over the free end of said blades, said wire forcing means moving independently of the movement of said first and second blade holders.

7. The insertion device of claim 6 wherein both of said first and second blade holders are movably mounted with respect to one another and to said supporting platform, said moving means comprising a cam track mounted to said support platform, said cam track including a race having a plurality of peaks and valleys formed in it, a first plurality of cam follower means operatively connected between said first blade holder and said cam track, and a second plurality of cam follower means operatively connected between said second blade holder and said cam track, said first plurality of cam follower means being positioned along a peak of said race.

8. The insertion device of claim 7 wherein said first and said second plurality of cam follower means respectively include at least a first cam follower positioned in said race, and a cam bracket mounted between said cam follower means and one of said first and said second blade holders.

9. The insertion device of claim 6 wherein said moving means includes spring means biased between said first and said second blade holders, and means for vibrating at least one of said first and said second blade holders.

10. The insertion device of claim 9 wherein said vibrating means is energizable electrically.

11. The insertion device of claim 10 wherein said electrically energizable means is carried by one of said first and said second blade holders.

12. In a winding insertion device including a supporting platform, a plurality of blades arranged in an annular array, said blades each having a first end attached to said device and a free second end, and a stripper movably mounted between a first position below the free ends of the blades and a second position near the free ends of the blades, the improvement which comprises means for providing relative movement between individual ones of said blades independent of but in conjunction with movement of said stripper between said first and said second positions, said relative movement providing means including a first blade holder operatively connected to said supporting platform, said first blade holder having a first number of said blades attached to it, a second blade holder operatively connected to said supporting platform, said second blade holder having a second number of said blades attached to it, and means for moving one of said first and said second blade holders with respect to the other of said first and said second blade holders.

* * * * *

UNITED STATES PATENT AND TRADEMARK OFFICE
CERTIFICATE OF CORRECTION

PATENT NO. : 4,047,293
DATED : September 13, 1977
INVENTOR(S) : Vernon E. Kieffer It is certified that error appears in the above-identified patent and that said Letters Patent are hereby corrected as shown below:

Col. 3, line 19, "Referring not to FIG. 1," should be "Referring now to FIG. 1,"

Signed and Sealed this

Thirty-first Day of January 1978

[SEAL]

Attest:

RUTH C. MASON
Attesting Officer

LUTRELLE F. PARKER
Acting Commissioner of Patents and Trademarks